US009038476B2

(12) United States Patent
Strei et al.

(10) Patent No.: US 9,038,476 B2
(45) Date of Patent: May 26, 2015

(54) PRESSURE TRANSMITTER WITH FILL TUBE (71) Applicant: Rosemount Inc., Chanhassen, MN (US)

(72) Inventors: David Matthew Strei, Waconia, MN (US); Kenneth Guttsen, Chaska, MN (US)

(73) Assignee: Rosemount Inc., Chanhassen, MN (US)

( * ) Notice: Subject to any disclaimer, the term of this patent is extended or adjusted under 35 U.S.C. 154(b) by 189 days.

(21) Appl. No.: 13/628,384

(22) Filed: Sep. 27, 2012

(65) Prior Publication Data
US 2014/0083171 A1  Mar. 27, 2014

(51) Int. Cl.
*G01L 7/00* (2006.01)
*G01L 19/06* (2006.01)

(52) U.S. Cl.
CPC ............. *G01L 19/06* (2013.01); *G01L 19/0645* (2013.01)

(58) Field of Classification Search
USPC .................................................. 73/700–756
See application file for complete search history.

(56) References Cited

U.S. PATENT DOCUMENTS

| 2009/0165424 | A1* | 7/2009 | Lutz | 53/289 |
| 2010/0083731 | A1* | 4/2010 | Hedtke | 73/1.57 |
| 2010/0307254 | A1 | 12/2010 | Klosinski et al. | |
| 2013/0031984 | A1* | 2/2013 | Jones et al. | 73/717 |
| 2013/0031985 | A1* | 2/2013 | Wade et al. | 73/753 |
| 2013/0031986 | A1* | 2/2013 | Eckhardt et al. | 73/756 |

FOREIGN PATENT DOCUMENTS

WO   96/06338   2/1996

OTHER PUBLICATIONS

International Search Report and Written Opinion of the International Searching Authority dated Jul. 30, 2013 in International Appln. No. PCT/US2013/030390, filed Mar. 12, 2013. 9 pgs.

* cited by examiner

*Primary Examiner* — Andre Allen
(74) *Attorney, Agent, or Firm* — Westman, Champlin & Koehler, P.A.

(57) ABSTRACT

A pressure transmitter has a pressure sensor, an isolator diaphragm, and a fill tube. Interior passages in the pressure sensor module body are filled with isolator fluid and provide fluid connections. The isolator fluid couples pressure from the first isolator diaphragm assembly to the pressure sensor. A first crimp portion of the fill tube radially narrows into a substantially solid circular cylindrical cross section to form a first primary seal that is resistant to high pressure cycling.

17 Claims, 6 Drawing Sheets

PRESSURE TRANSMITTER WITH FILL TUBE

BACKGROUND OF THE INVENTION

The present invention relates to industrial process pressure transmitters that include pressure sensors that are isolated from industrial process fluids. More specifically, the present invention relates to sealing of isolation systems in such transmitters.

Industrial process control systems are used to monitor and control industrial processes used to produce or transfer fluids or the like. In such systems, it is typically important to measure "process variables" such as temperatures, pressures, flow rates, and others. Process control transmitters are used to measure such process variables and transmit information related to the measured process variable back to a central location such as a central control room.

One type of process variable transmitter is a pressure transmitter which measures pressure of a process fluid and provides an output related to the measured pressure. This output may be a pressure, a flow rate, a level of a process fluid, or other process variable. The transmitter is configured to transmit information related to the measured pressure back to a central control room or the like. The transmission is typically over a two wire process control loop, however, other process control loops may be used including those which use wireless technologies.

Pressure of the process fluid is coupled to a process fluid transmitter through some kind of a process coupling. For example, the process fluid can comprise a component used in an industrial process such as natural gas, oil, etc. Some of the materials may be under extremely high pressures. These high pressures can include cyclical pressure pulses that repeat over long period of times such as months or years, repeatedly cycling piping and other mechanical parts in contact with the process fluid.

There is a need to improve pressure transmitters to withstand repeated cyclical pressure pulses on high pressure process fluids over long periods of time.

SUMMARY

An industrial pressure transmitter includes a pressure sensor, a first isolator diaphragm assembly that is couplable to a first process pressure, and a first fill tube. First interior passages connect the pressure sensor, the first isolator diaphragm assembly and the first fill tube to one another. Isolator fluid is provided in the first interior passages and couples pressure from the first isolator diaphragm assembly to the pressure sensor. A first crimp portion of the fill tube radially narrows into a substantially solid circular cylindrical cross section to form a first primary seal that is resistant to high pressure cycling.

DETAILED DESCRIPTION

As discussed in the Background section, pressure transmitters couple to the process fluid through some type of process coupling. In many instances, this coupling isolates a pressure sensor of the transmitter from physical contact with the process fluid. For example, the process fluid can be configured to apply pressure to an isolation diaphragm which transfers the pressure to a fill fluid carried in a fill tube. The fill fluid then applies the pressure to the pressure sensor for sensing. During manufacture of the device, the fill fluid is introduced into the fill tube through an opening in the fill tube. In typical prior art designs, this opening is sealed by crimping a portion of the tube and sealing the tube at the crimp. However, in one aspect, the present invention recognizes that where this crimping occurs, the fill tube may experience a great deal of stress and undergo expansion and contraction as high pressure is applied. This activity, over time, can fatigue the fill tube and lead to failure. As discussed below in more detail, the present invention provides a new crimp configuration for a fill tube, along with a method of achieving the same, which addresses this problem.

In the embodiments discussed below in connection with the figures, a crimp for a fill tube in an industrial process pressure transmitter is disclosed. The fill tube is filled with isolator fluid. The crimp is disposed on a crimp portion of the fill tube that is collapsed into a substantially solid circular cylindrical cross section to form a primary seal of the fill tube. The primary seal seals the isolator fluid in the fill tube. The use of a circular cylindrical cross-section provides a substantially symmetrical seal shape that is free of large stress concentrations associated with non-circular crimps. The circular cylindrical cross section is particularly resistant to cracking during long term, high pressure cycling in the 0 to 15,000 PSI pressure range encountered in some industrial installations. The useful life of the industrial process pressure transmitter, when used in difficult industrial application, is extended.

Figure 1:
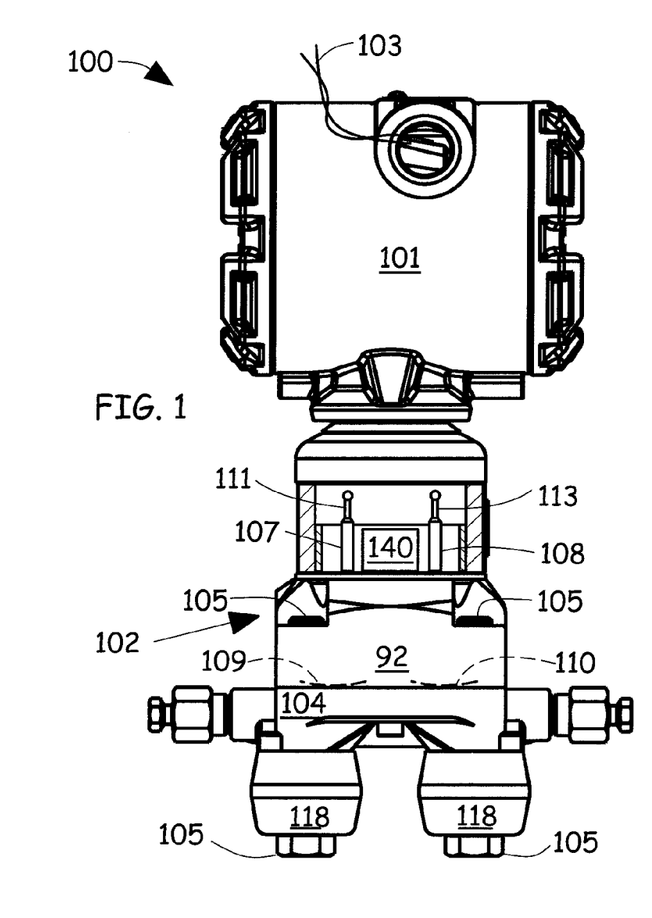
FIGS. 1-2 illustrate an exemplary process pressure transmitter.
Figure 2:
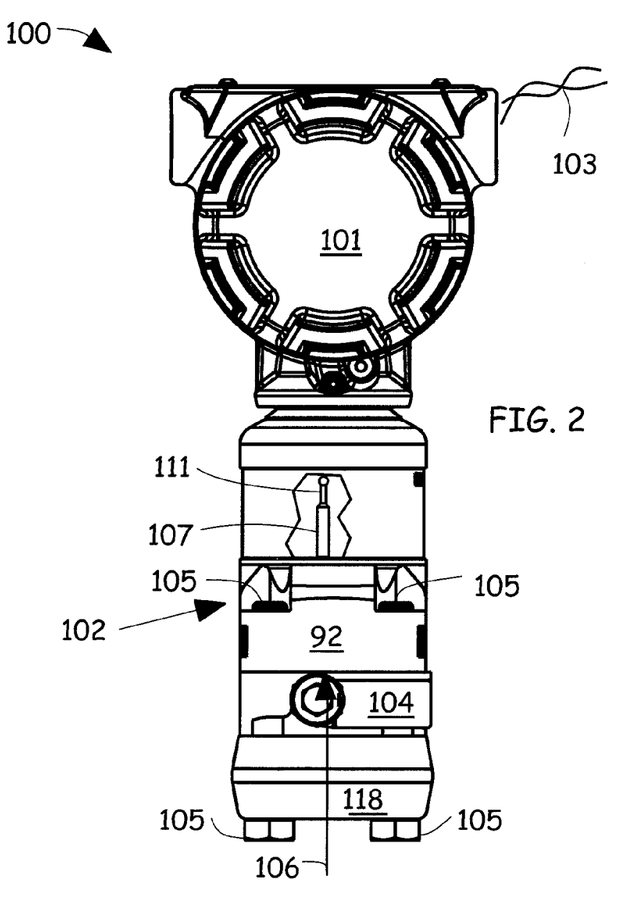

FIGS. 1-2 illustrate front and side views (with portions broken away) of an exemplary pressure transmitter 100. Pressure transmitter 100 includes an electronics housing 101 that encloses electronic circuitry (not illustrated in FIGS. 1-2). Pressure transmitter 100 includes a pressure sensor module 102 that houses isolator diaphragms 109, 110, a pressure sensor 140, fill tubes 107, 108 and associated sensor circuitry (illustrated in FIG. 4). As described in more detail below, the fill tubes 107, 108 are crimped with crimp portions 111, 113 that have substantially solid circular cylindrical cross sections. The crimp portions 111, 113 have symmetrical round cross sections and uniformly distribute stress due to high pressurization, thus reducing stress concentrations, particularly in transition regions between crimped and uncrimped portions of tubes 107, 108. The crimp portions 111, 113 provide primary seals for containing controlled quantities of isolator fluid (illustrated in FIGS. 5, 6, 7B) in the pressure sensor module 102. The primary seals provided by crimp portions 111, 113 are radially symmetric and provide a high level of resistance to cracking due to repeated high process pressure cycling in process fluids that couple to the pressure sensor module 102.

The pressure sensor module 102 includes a pressure sensor module body 92 that is bolted to a pressure flange 104 by bolts 105. The bolts 105 also pass through flange adapter unions 118. The flange adapter unions 118 have threaded inlets which are connectable to threaded process pipes (not illustrated). The pressure flange 104 couples one or more process fluid pressures 106 to the transmitter 100 for pressure measurement. The pressure flange 104 functions as a process coupling. Electronic circuitry in the pressure transmitter 100 is connected to a process loop 103 that energizes the pressure transmitter 100 and provides bidirectional communication for use in a process control system. The connection of the pressure sensor module 102 to the pressure flange 104 and bolts 105 is described in more detail below in connection with FIG. 3.

Figure 3:
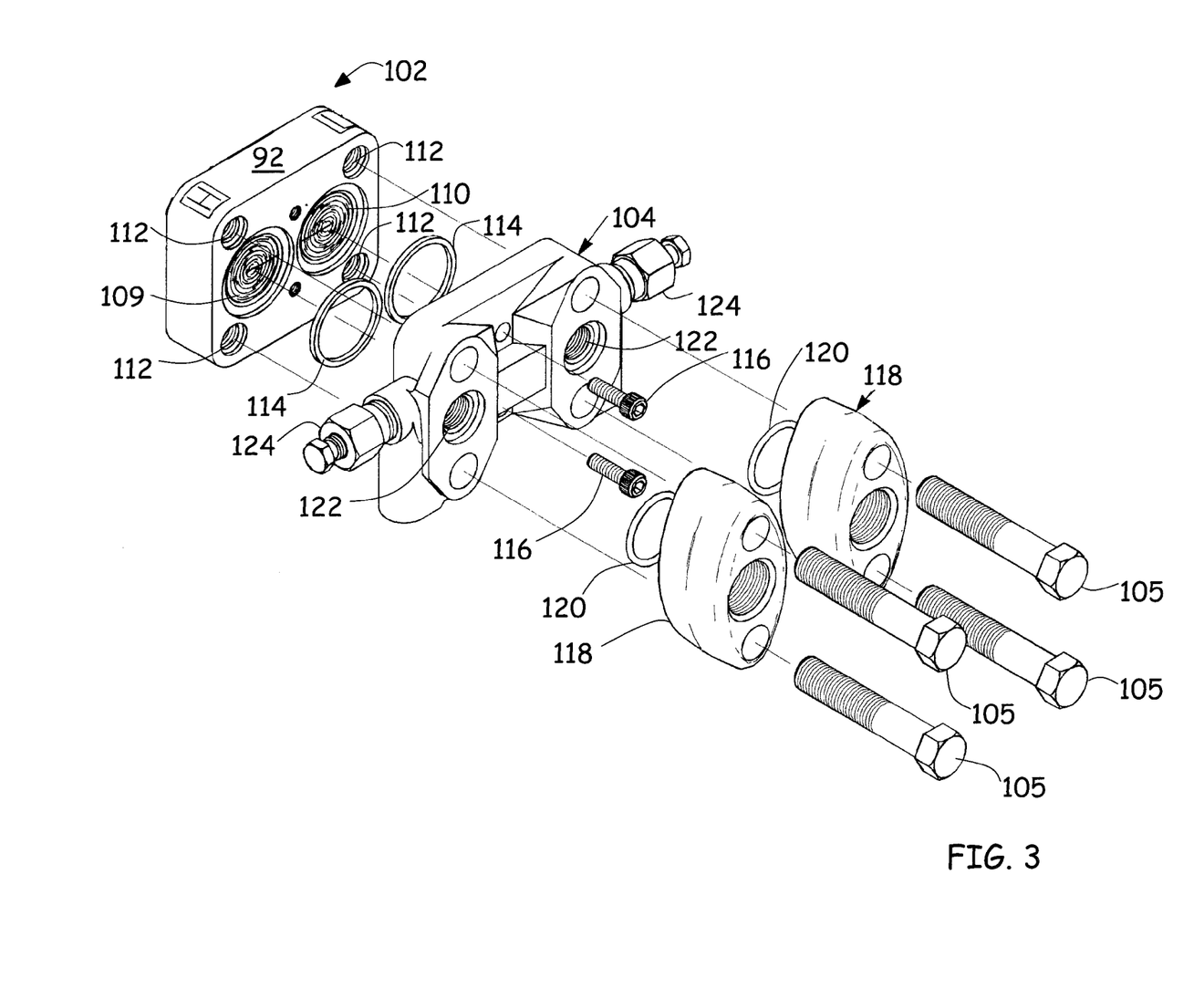
FIG. 3 illustrates an example of a process coupling that is used to connect a pressure transmitter to process fluids.

FIG. 3 schematically illustrates an exploded view of the pressure sensor module body 92 of the pressure sensor module 102, the pressure flange 104, the flange adapter unions 118 and the bolts 105 shown in FIGS. 1-2. FIG. 3 illustrates external surfaces of the isolator diaphragms 109, 110 that are welded to the pressure sensor module body 92. The pressure sensor module body 92 includes threaded bolt holes 112 in a standard pattern around the isolator diaphragms 109, 110. Screws 116 temporarily hold the pressure flange 104 and gaskets 114 in place during shipment and prior to making field process connections. The pressure flange 104 is fitted with drain/vent valves 124.

Flange adapter unions 118 are threaded onto process fluid piping (not illustrated) and then are sealed to pressure flange 104 by gaskets 120. As an alternative to using the flange adapter unions 118, process pipe fittings can be threaded directly into threaded holes 122 in the pressure flange 104. The bolts 105 pass through the flange adapter unions 118 (when used), the pressure flange 104, and are threaded into threaded bolt holes 112.

Figure 4:
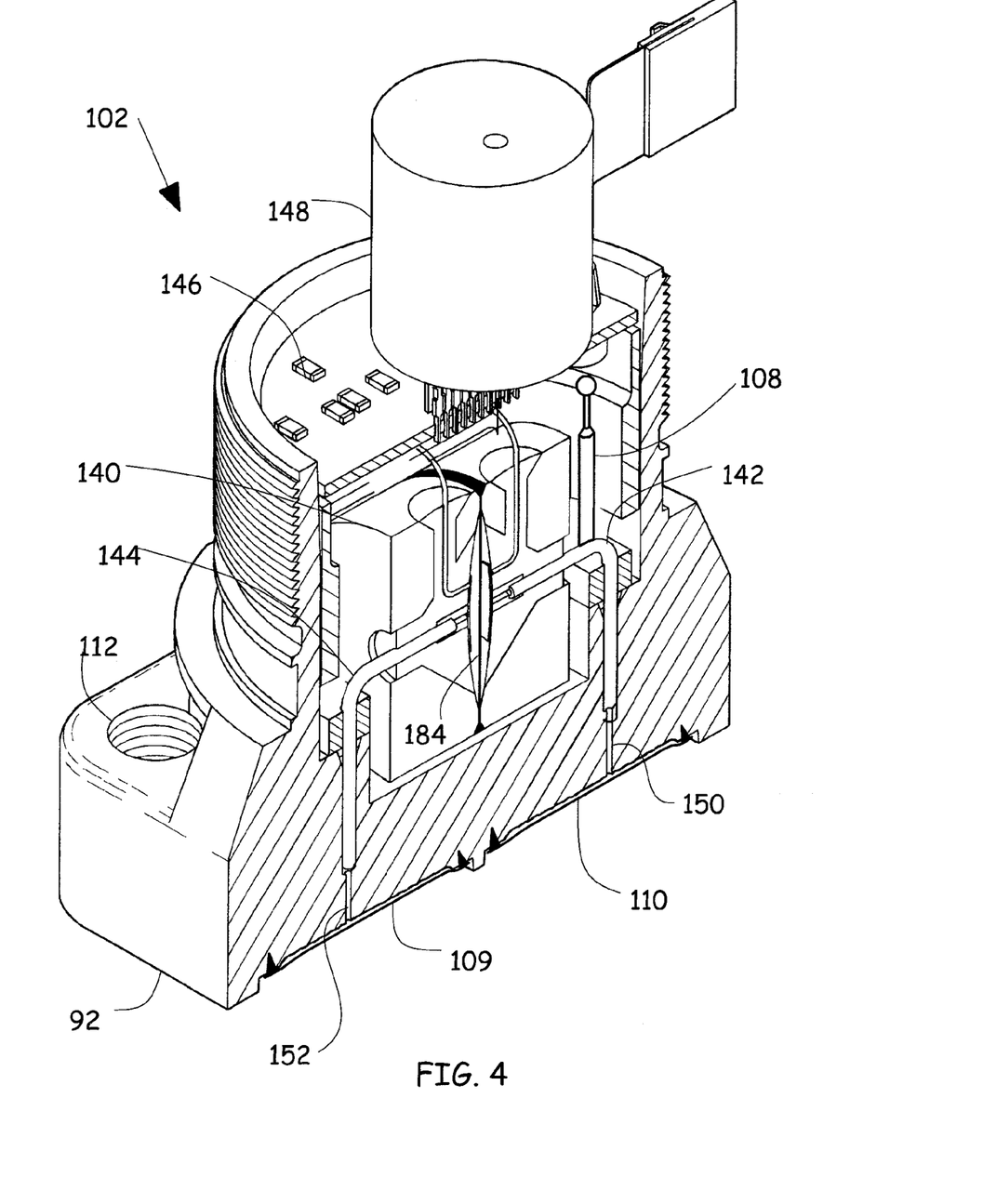
FIG. 4 illustrates a pressure sensor module that is a component of a process pressure transmitter.

FIG. 4 illustrates an oblique sectional view of the pressure sensor module 102, including the pressure sensor module body 92. The pressure sensor 140 comprises a differential pressure sensor and is located inside the module body 92. The pressure sensor 140 includes internal cavities and passages that are filled with isolator fluid. The pressure sensor 140 includes a central pressure sensing diaphragm 184 that divides the pressure sensor 140 into two halves that have separated quantities of isolator fluid in them. The two halves of the pressure sensor 140 connect by their tubes 142, 144 and drilled passageways 150, 152 to fluid-filled cavities adjacent the isolator diaphragms 109, 110. The isolator diaphragms 109, 110 are welded directly to the module housing 92. An exemplary fill tube 108 is shown in FIG. 4 that connects via a passage (illustrated in FIG. 5) to fluid filled cavities adjacent the isolator diaphragm 110. A circuit board 146 is electrically connected to the pressure sensor 140, and comprises electronic circuitry associated with processing electrical signals from the pressure sensor 140.

A flat cable reel 148 houses a coiled flat cable that provides electrical connections from the circuit board 146 to electronic circuitry in an electronics housing (such as housing 101 shown in FIGS. 1-2). As described in more detail below in connection with FIG. 5, the pressure sensor 140, isolator diaphragms 109, 110 and fill tubes 107, 108 (FIGS. 1-2) are connected by first and second interior passageways that are filled with a controlled quantity isolator fluid and that communicate process pressures from the isolator diaphragms 109, 110 to the differential pressure sensor 140.

According to one aspect, the volume of the controlled quantity of isolator fluid is set by application of a partial vacuum to external surfaces of an isolator diaphragms 109, 110 during application of radial compressive force to form crimps 111, 113 (FIG. 1). According to another aspect, positions of the isolator diaphragms 109, 110, without pressurization, are correct for setting the volume of isolator fluid. According to yet another aspect, the volume of isolator fluid can be set by application of pressures to the open ends of the fill tubes, during crimping, to deflect the isolator diaphragms 109, 110. After sealing using the crimps 111, 113, the isolator diaphragms 109, 110 are set to be deflectable (by process pressures) through a full measurement range of the diaphragm 184 of the pressure sensor 140 in all operating temperatures.

Figure 5:
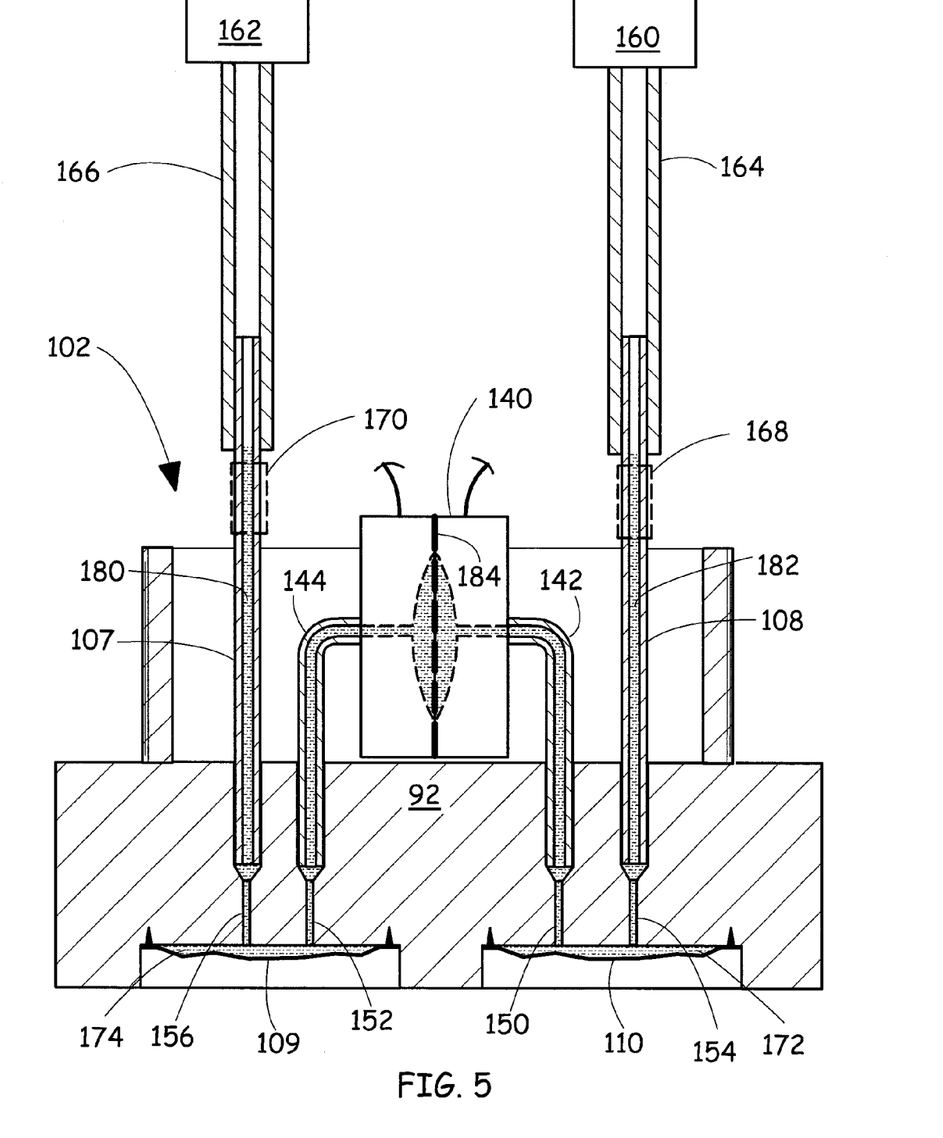
FIG. 5 illustrates filling a pressure sensor module with isolator fluid.

FIG. 5 schematically illustrates an initial step in a method of filling interior passages of two isolation systems in the pressure sensor module 102 with separate quantities of isolator fluids. As illustrated in FIG. 5, the fill tubes 107, 108 (also called first and second fill tubes) are fluidly coupled to isolator diaphragms 109, 110 (also called first and second isolator diaphragms) by drilled interior passages 154, 156 in the pressure sensor module body 92. The two sides of the differential pressure sensor 140 are fluidly coupled by the sensor's tubes 142, 144 and interior drilled passage 150, 152 to the isolator diaphragms 109, 110. Before filling with isolator fluid, the tubes 142, 144 and 107, 108 are welded to the pressure sensor module body 92 to form seals between the tubes 142, 144, 107, 108 and the pressure sensor module body 92. In normal use, external surfaces of the isolator diaphragms 109, 110 are couplable to process fluids in an industrial installation and isolate the internal components of the module 102 from the process fluids.

The fill tubes 107, 108 includes crimp portions 168, 170 (also called first and second crimp portions) that, at this stage of processing, are not crimped and permit isolator fluid flow. Isolation fill devices 160, 162 are connected to the fill tubes 107, 108 by flexible tubes 164, 166. The isolator fill devices 160, 162 include vacuum sources and evacuate air from the flexible tubes 164, 166, the fill tubes 107, 108, the passages 150, 152, 154, 156, the sensor 140 and isolator cavities 172, 174 enclosed by the isolator diaphragms 109, 110. After evacuation, vacuum sources are closed off, and then first and second controlled quantities of isolator fluid 180, 182 are provided by the isolation fill devices 160, 162 to passageways 150, 152, 154, 156 and to the opposite sides of sensor 140 and the cavities 172, 174. The controlled quantities of isolator fluids 180, 182 are sufficient to fill the first and second fill tubes 107, 108 to a level above the first and second crimp portions 168, 170 as illustrated.

The pressure sensor module body 92 is provided with the interior passages 150, 152, 154, 156 that extend to the pressure sensor 140 (including its tubes 142, 144), the first and second isolator diaphragms 109, 110, the first and second isolator cavities 172, 174 and the first and second fill tubes 107, 108. The various interior passageways, tubes and cavities are filled with the controlled quantities of isolator fluid 180, 182. As illustrated, the pressure sensor module 102 is a differential pressure module and includes two complete, separate first and second isolation systems. The two controlled quantities of isolator fluid 180, 182 are separated from one another by a central barrier in the form of the pressure sensor diaphragm 184 in the pressure sensor 140. The two controlled quantities of isolator fluid 180, 182 are free of air and completely fill the first and second separate isolation systems to levels that are above the crimp portions 168, 170. The flexible tubes 164, 166 are then disconnected from the fill tubes 107, 108 in preparation for use of a crimping tool such as the crimping tools described below in connection with FIGS. 6A-6F, 11.

Figure 6:
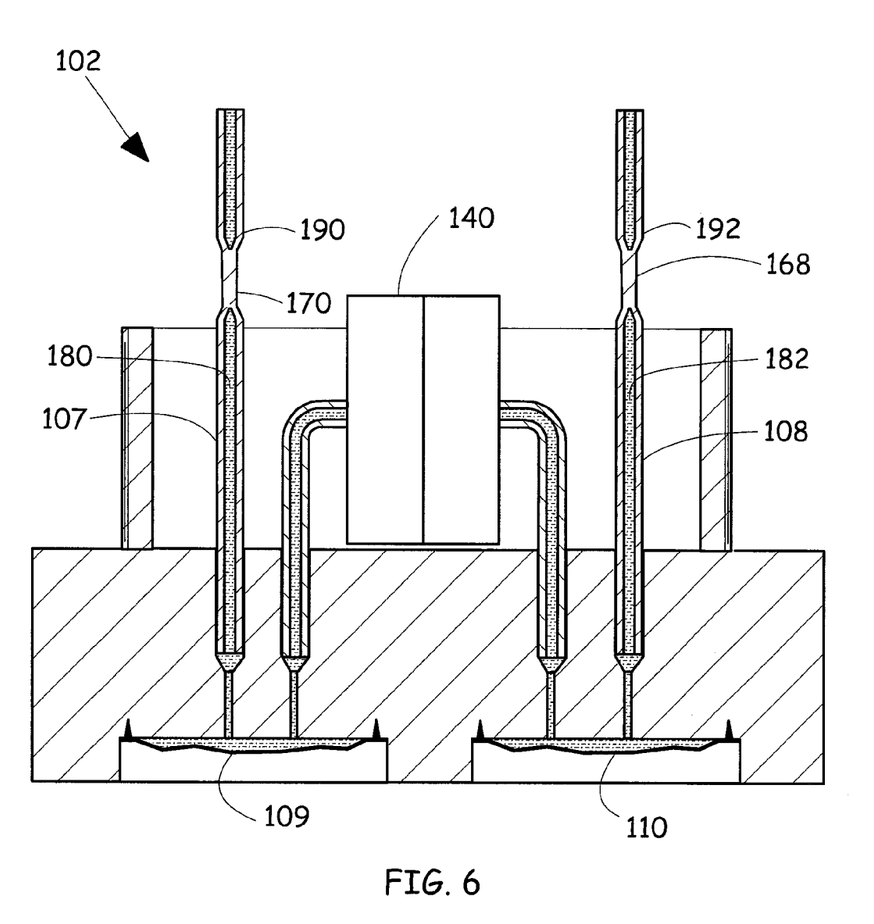
FIG. 6 illustrates a pressure sensor module of FIG. 5 after crimping of fill tubes.

FIG. 6 schematically illustrates the pressure sensor module 102 (FIG. 5) after crimping crimp portions 168, 170. The crimp portions 168, 170 are compressed to such an extent that the solid cylindrical cross sections of the crimp portions 168, 170 form primary seals that seal the controlled quantities of isolator fluid 180, 182 in the interior passages. The controlled quantities of fluid are free of bubbles and are substantially incompressible. Excess fill tube portions 190, 192 in FIG. 6 are cut off after completion of crimping in preparation for application of secondary seals as illustrated below in an example in FIGS. 7A, 7B, 7C. Reference numbers shown in FIG. 6 that are the same as reference numbers shown in FIG. 5 indicate the same elements in pressure module 102.

The quantity of isolator fluid that is sealed in by the crimping of crimp portions 168, 170 is controlled during the crimping process by application of controlled pressures. The application of external controlled pressures deflects the isolator diaphragms 109, 110 so that, after sealing is complete, the isolator diaphragms 109, 110 are in positions so that the isolator diaphragms 109, 110 are deflectable through a full pressure measurement range of the pressure sensor, without bottoming out before the maximum pressure is reached. According to one aspect, the external controlled pressures are applied during crimping at the fill tubes by the isolator fill devices 160, 162 (FIG. 5). According to another aspect, the external controlled pressures are partial vacuum pressures applied at external surfaces of the isolator diaphragms 109, 110 during crimping.

Figure 7A:
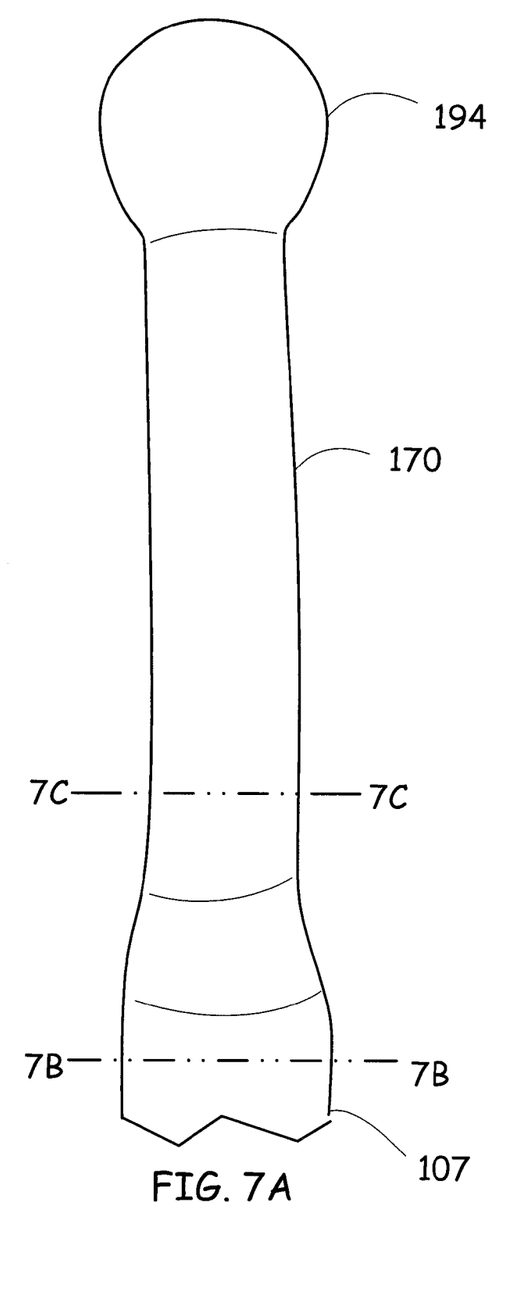
FIG. 7A illustrates an enlarged view of a crimped portion of a fill tube.
Figure 7B:
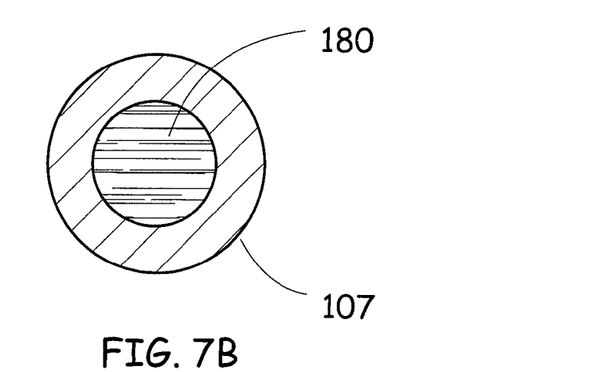
FIG. 7B illustrates a cross sectional view along line 7B-7B in FIG. 7A of a portion of a fill tube that is not crimped.
Figure 7C:
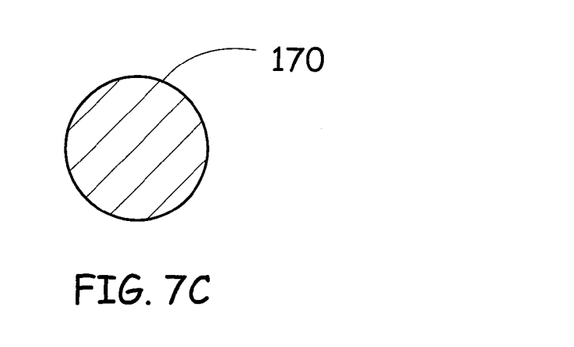
FIG. 7C illustrates a cross sectional view along line 7C-7C of a crimped portion of a fill tube.

FIGS. 7A, 7B, 7C illustrate an exemplary fill tube 107 after application of a secondary seal 194. The secondary seal 194 comprises a weld. As illustrated in FIG. 7A, the secondary seal 194 has an exemplary generally spheroid shape and comprises a bead of brazed metal that has cooled. Depending on the particular weld process used, the secondary seal 194 can have shapes that are other than spheroid. The secondary seal 194 is redundant to the primary seal at 170. FIG. 7B illustrates a cross sectional view of an exemplary uncrimped portion of the fill tube 107 along line 7B-7B in FIG. 7A. The fill tube 107 in FIG. 7B is filled with isolator fluid 180. FIG. 7C illustrates a cross sectional view along line 7C-7C in FIG. 7A of an exemplary crimped portion 170. The crimped portion 170 comprises a solid circular cylindrical cross section that seals in the isolator fluid 180 (FIG. 7B). The crimp portion 170 is radially collapsed into the solid circular cylindrical cross section to form a primary seal. The substantially solid round, symmetrical cylindrical cross section illustrated at FIG. 7C is highly resistant to failure from repeated pressurization cycles of the isolator fluid.

The terms "weld", "welding" as used in this application refer to producing a bond between two similar or dissimilar metals by heating a joint, with or without pressure, and with or without filler metal, to a temperature at or above the melting point of at least one of the metals or filler metals. Welding includes electrical arc welding, gas welding, inert gas welding, soldering, brazing, and the like.

Although the present invention has been described with reference to preferred embodiments, workers skilled in the art will recognize that changes may be made in form and detail without departing from the spirit and scope of the invention.

What is claimed is:

1. A method of filling a pressure sensor module of a process pressure transmitter with isolator fluid, comprising:
providing a pressure sensor module body with interior passages that extend to a process pressure sensor, to an isolator diaphragm assembly that is couplable to a process fluid, and to a fill tube;
filling the interior passages through the fill tube with the isolator fluid; and
applying a radial compressive force to a crimp portion of the fill tube, the radial compressive force compressing the crimp portion into a substantially solid circular cylindrical cross section such that the isolator fluid is sealed in the interior passages by the crimp portion.

2. The method of claim 1, further comprising:
applying the radial compressive force to an extent that the solid circular cylindrical cross section forms a primary seal that seals the isolator fluid in the interior passages.

3. The method of claim 1, wherein the pressure sensor comprises a differential pressure sensor located in the pressure sensor module body.

4. The method of claim 3 wherein the differential process pressure sensor comprises a capacitive pressure sensor.

5. The method of claim 4 wherein the capacitive pressure sensor comprises a central pressure sensing diaphragm that divides the capacitive pressure sensor into two halves that have separated quantities of isolator fluid in them.

6. The method of claim 1, further comprising:
cutting off a portion of the fill tube to expose a crimp end of the crimp portion; and
welding the crimp end to form a secondary seal of the fill tube.

7. The method of claim 6 wherein the crimp portion and the secondary seal withstand isolator fluid pressures of at least 15,000 pounds per square inch.

8. The method of claim 7 wherein crimp portion and the secondary seal provide redundant sealing.

9. The method of claim 1 where a quantity of the isolator fluid is controlled by an external application of controlled pressure that deflects the isolator diaphragm during application of the radial compressive force.

10. The method of claim 1 wherein a quantity of the isolator fluid is controlled by application of a partial vacuum to an external surface of the isolator diaphragm assembly during application of the radial compressive force.

11. A process pressure transmitter, comprising:
a pressure sensor module body, a pressure sensor, a first isolator diaphragm assembly that is couplable to a first process pressure, and a first fill tube;
first interior passages in the pressure sensor module body that connect the pressure sensor, the first isolator diaphragm assembly and the first fill tube to one another;
a first isolator fluid in the first interior passages, the first isolator fluid coupling pressure from the first isolator diaphragm assembly to the pressure sensor; and
a first crimp portion of the fill tube that radially narrows into a substantially solid circular cylindrical cross section to form a first primary seal.

12. The pressure sensor module of claim 11, and further comprising:
a weld that seals an outer end of the first crimp portion to form a first secondary seal that is redundant to the first primary seal.

13. The pressure sensor module of claim 11 wherein the isolator diaphragm assembly includes a first isolator diaphragm, and the first isolator fluid volume is set by closure of the first crimp portion so that the first isolator diaphragm is deflectable throughout a full pressure measurement range of the pressure sensor after completion of the closure.

14. The pressure sensor module of claim 11, wherein the pressure sensor comprises a differential pressure sensor and the pressure sensor module comprises a second isolator diaphragm assembly, a second fill tube and second interior passages, separate from the first interior passages, the second interior passages connecting the differential pressure sensor, the second isolator diaphragm, and the second interior passages to one another, and the second fill tube including a second crimp portion that radially narrows into a substantially solid circular cylindrical cross section to form a second primary seal.

15. A process pressure transmitter, comprising:
    a pressure sensor module body, a differential pressure sensor, a first isolator diaphragm assembly that is couplable to a first process pressure, and a first fill tube;
    first interior passages in the pressure sensor module body that connect the differential pressure sensor, the first isolator diaphragm assembly and the first fill tube to one another;
    a first isolator fluid in the first interior passages, the first isolator fluid coupling pressure from the first isolator diaphragm assembly to the differential pressure sensor; and
    a first crimp portion of the fill tube that radially narrows into a substantially solid circular cylindrical cross section to form a first primary seal.

16. The pressure sensor module of claim 15, and further comprising:
    a weld that seals an outer end of the first crimp portion to form a first secondary seal that is redundant to the first primary seal.

17. The pressure sensor module of claim 15 wherein the isolator diaphragm assembly includes a first isolator diaphragm, and the first isolator fluid volume is set by closure of the first crimp portion so that the first isolator diaphragm is deflectable throughout a full pressure measurement range of the pressure sensor after completion of the closure.

* * * * *